INVENTORS
EUGENE A. MARKS,
ROGER B. SPERLING

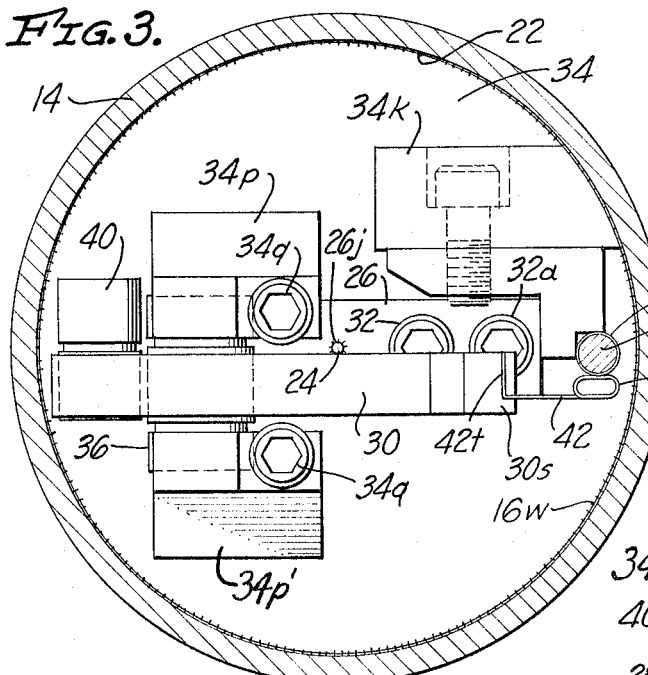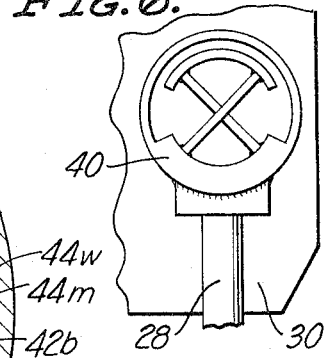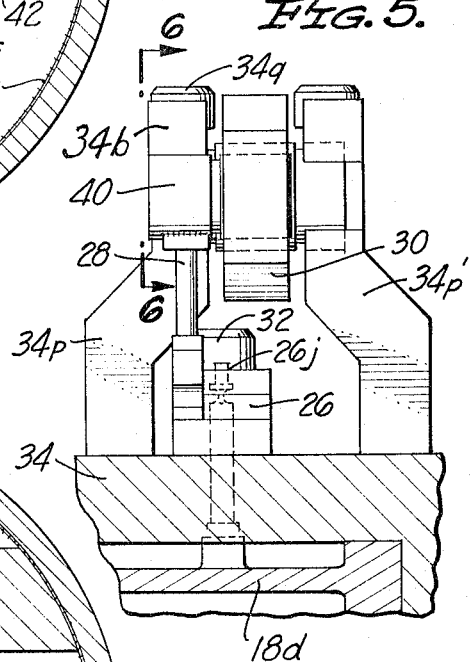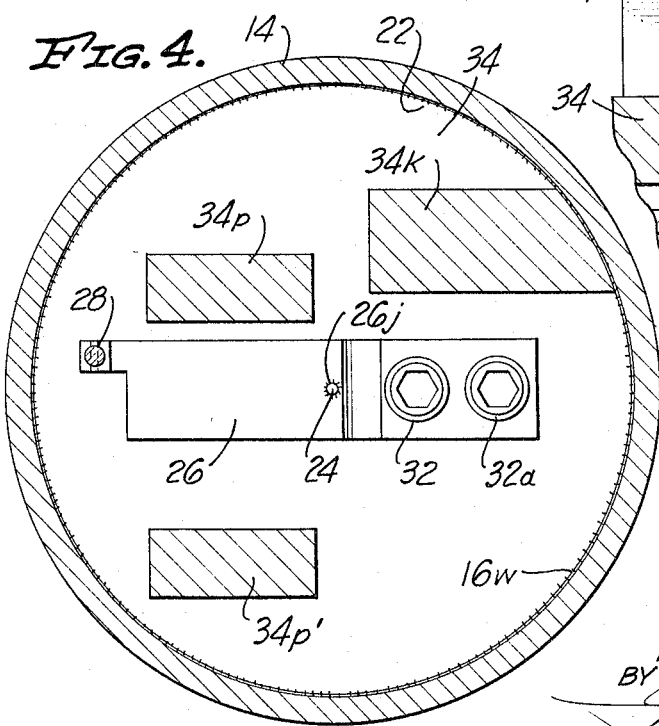

INVENTORS
EUGENE A. MARKS,
ROGER B. SPERLING

United States Patent Office 3,289,136
Patented Nov. 29, 1966

3,289,136
DRY HIGH-PRESSURE POTENTIOMETRIC
TRANSDUCER
Eugene A. Marks and Roger B. Sperling, Riverside, Calif.,
assignors to Bourns, Inc., a corporation
Filed Nov. 27, 1964, Ser. No. 414,069
3 Claims. (Cl. 338—42)

The invention herein disclosed pertains to potentiometric pressure transducers, and more particularly to such transducers in which relative movement of electronic or electrical members of a potentiometer occurs in response to elastic deformation of a diaphragm or like pressure-sensitive device incident to change of pressure exerted by a fluid to which the pressure-sensitive device is exposed. Still more particularly, the invention pertains to pressure transducers of the above-noted type and capable of accurate indication of high pressures in the complete absence of oil or like damping media as, for example, in cryogenic and/or oxygen environments. Succinctly described, as invention is what may be termed improvements in a dry potentiometric high-pressure transducer.

Presently available pressure transducers of the general type here of interest are such as to require means for effecting damping of spurious movements of parts that are induced by externally applied variable forces, when the transducers are used in vibratory environments. In general, such damping is effected by oil or like media, ordinarily confined so as to resist movement of the pressure-sensitive device or devices and in instances the connecting linkages or means as well. In many applications of high-pressure transducers in the aerospace industry, the use of vibration or movement damping media such as oil or the like is extremely objectionable and in some cases is prohibited, despite environments of severe vibration. Thus it is extremely desirable in many cases to have a pressure transducer that is concurrently very small and compact while free of adverse effects caused by vibratory forces and capable of measuring or indicating high pressures and characterized both by a high degree of accuracy and by complete absence of oil or like damping media, that is, is "dry."

The present invention attains those desired results and others as well, in part by utilizing as a pressure-sensitive member or sensor an elastic device whose total movement or travel in translating the entire pressure range is extremely small whereby the natural vibration frequency may be very high, and in part by amplifying the very small travel or movement of the sensor by a very large amplification factor by novel extremely accurate motion-amplifying means characterized by substantially complete absence of friction and by very low hysteresis. The components are of unusually small dimensions, whereby masses are kept to very low values. The sensor, preferably in the form of a relatively thick diaphragm or septum, is connected to the electrical translating component by dual motion-amplifying means of novel configuration and characteristics such that they may be compactly arranged in a very small space. The entire structure as well as the individual components have such high values of natural frequency of oscillation that no fluid damping of motion is required. Hence the total weight is reduced and concurrently the disadvantages attending use of oil are avoided. Thus in an exemplary transducer the pressure-sensitive member or sensor is in the form of a relatively thick elastic septum or diaphragm connected at its center to a first lever device by a lossless connector which lever device effects a frictionless amplification of movement or motion and which is in turn connected by a second lossless connector or transmitter to a second motion-multiplying lever device to which is directly connected one or the other of two relatively-movable electrical signaling devices. By employing for the lever devices and connectors or transmitters frictionless flexure-type support means of novel configuration that are fusion-united or integrally formed with the lever devices, masses and undesired deflections and hysteresis are all minimized while satisfactorily high and accurate amplification of motion is achieved with a structure of such rigidity as to be entirely immune to necessity for damping by fluid media under vibratory accelerations of as high intensity as 35 G. As will be evident to those skilled in the art, necessity for liquid damping can be avoided only by having the moving components and the diaphragm such as to have very high natural frequencies, e.g., much higher than 2000 c.p.s. Thus the sensor must have high effective area exposed to the fluid under pressure and must have very high stiffness, resulting in very low travel. As a consequence, a high degree of motion-amplification or "multiplication" is required. As is evident, the latter must be attained without introduction of serious error or other degradation of accuracy. Such results the invention accomplishes by novel means and arrangements presently to be described and explained in detail.

The preceding brief description of characteristics of the invention makes it evident that it is an object of the invention to provide improvements in potentiometric pressure transducers.

Another object of the invention is to provide improvements especially applicable to high-pressure potentiometric transducers.

An additional broad object of the invention is to provide an accurate potentiometric pressure transducer of the dry, high-pressure type.

Another object of the invention is to provide an accurate high-pressure transducer adapted for use in environments which preclude employment of fluid damping of movements of movable components of the transducer.

Another object of the invention is to provide a potentiometric pressure transducer of the dry high-pressure type that is substantially immune to adverse effects incident to being subjected to intense vibration of high frequency such as vibration at or somewhat in excess of 2000 c.p.s., of greater than 35 G acceleration.

Other objects of the invention, and advantages thereof, will be set forth or made evident in the appended claims or in the following description and explanation of a preferred exemplary pressure transducer embodying the invention, as illustrated, with modifications, in the accompanying drawings. In the drawings:

FIGURE 3 is a transverse sectional view, taken as indicated by broken line 3—3 in FIGURE 2;

FIGURE 4 is a transverse sectional view, taken as indicated by broken line 4—4 in FIGURE 2;

FIGURE 5 is a fragmentary view, partially in section and partially in elevation, depicting components viewed as indicated by broken line 5—5 in FIGURE 2;

Figure 7:
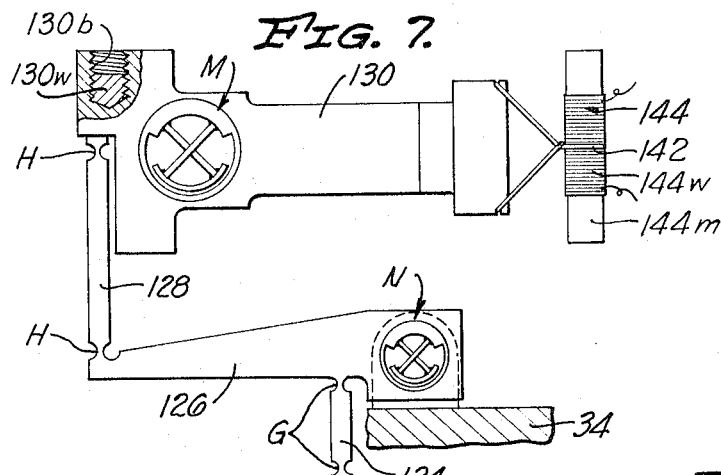
Figure 8:
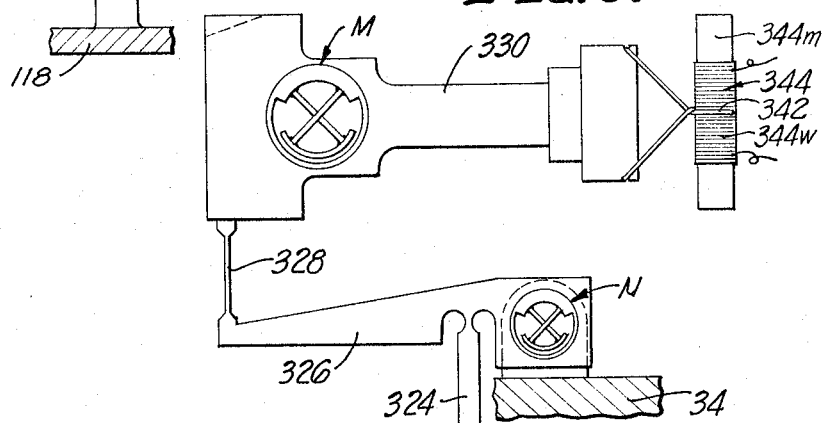
Figure 9:
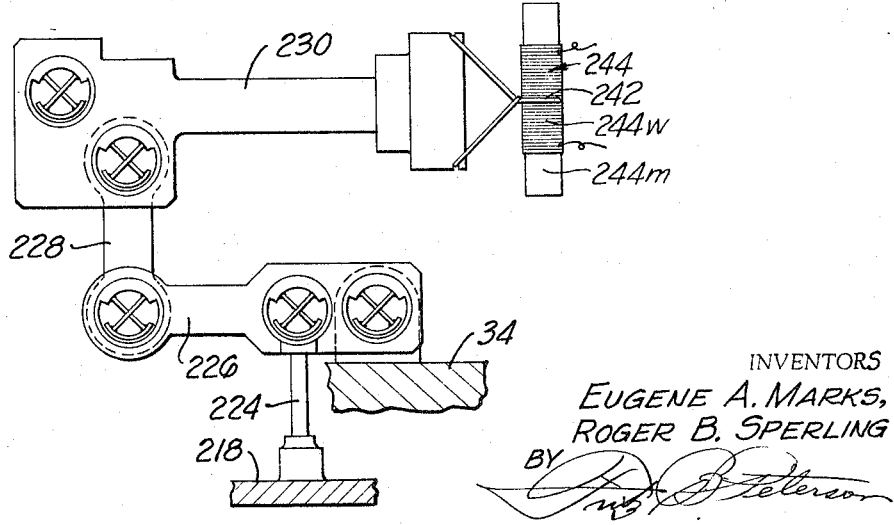

FIGURE 6 is a fragmentary view showing details of a fusion union of parts shown in FIGURE 5 and viewed as indicated by line 6—6 in the latter figure; and FIGURES 7, 8 and 9 are partly schematic drawings illustrating optional alternative and modified arrangements of lever devices and frictionless flexural pivot means thereof, including modified forms of lever systems in which lever devices and interconnecting transmitter means are integral.

Figure 2:
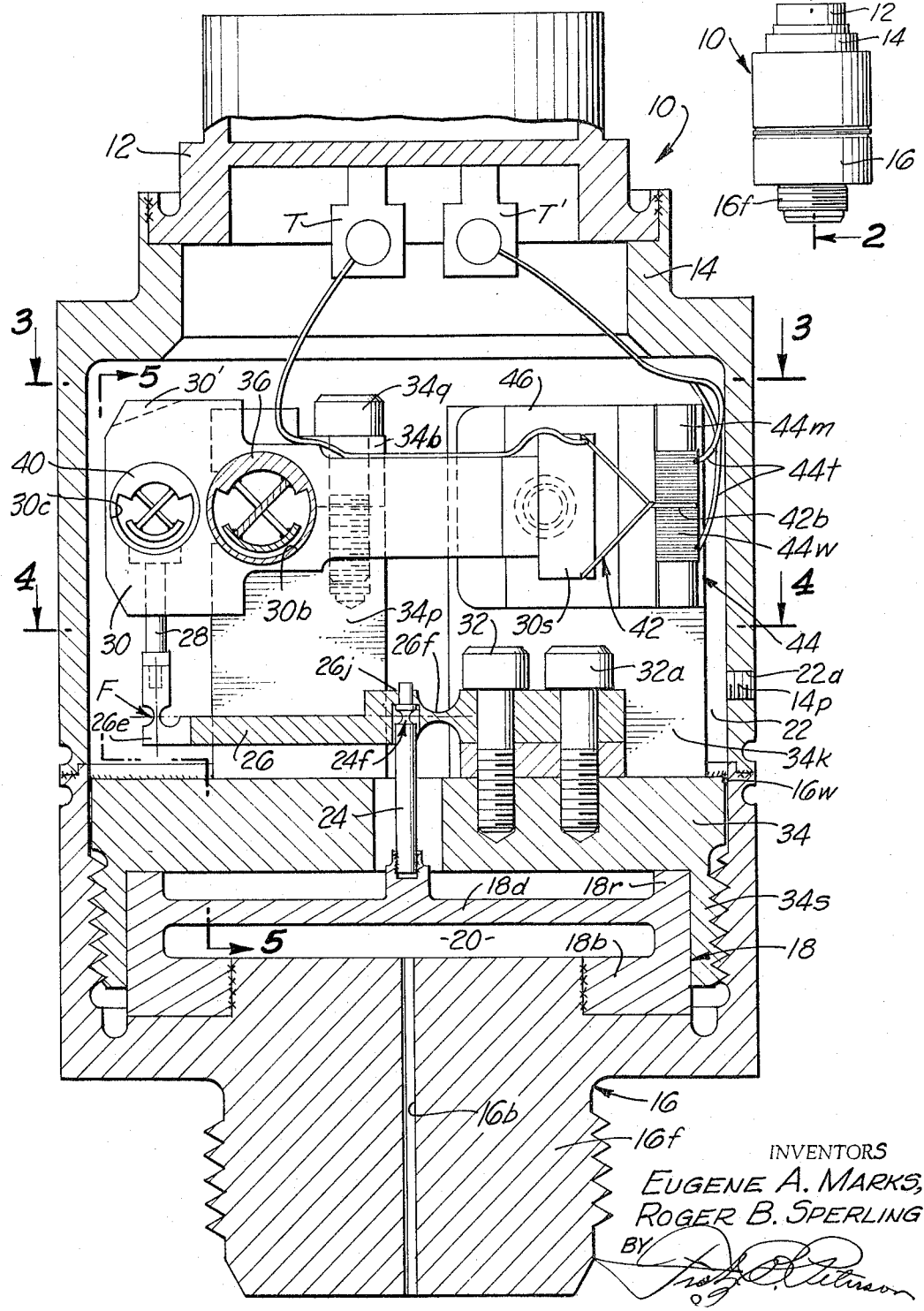
FIGURE 2 is a partial-sectional view in elevation, taken generally as indicated by broken line 2—2 in FIGURE 1, and showing relative positions and arrangements of principle components of the exemplary transducer.

Referring first to FIGURE 2, the exemplary potentiometric transducer 10, depicted in section and grossly enlarged, comprises casing or housing means including a cap 12, a cylinder or barrel 14, and an attachment 16 comprising a preferably integral pressure fitting 16f, all fusion-united as by brazing or the like, within which housing are disposed the active electrical and mechanical components or means of the transducer. In the lower part of the housing is disposed a diaphragm device 18 formed with a substantial rigid annular base 18b and substantial rigid rim 18r and an elastic or resilient diaphragm 18d, all preferably integral as illustrated. The base 18b of the diaphragm device is fusion-united to a rigid and unyielding portion of supporting means such as attachment 16 so as to form therewith a strong unyielding mount for the diaphragm and a fluid-tight juncture. The diaphragm device and the attachment 16 are shaped, preferably as shown, to provide therebetween a pressure chamber 20 into which fluid under pressure may be admitted via a bore 16b provided in the attachment. The thickness of the diaphragm, while necessarily variable in accord with the maximum pressure to be sensed and the material of which it is formed, is nevertheless relatively thick and such as to have a high resonant frequency (for example, in excess of 3000 c.p.s.) and such as to deform a maximum of a very small distance (for example, .003" for a diaphragm of 0.70" diameter).

The housing 10 is thus divided into two chambers, lower chamber 20 and an upper chamber 22, the two being separated by fluid-tight means including diaphragm 18d. As will be evident to those skilled in the art, chamber 22 may be evacuated and sealed, or left in communication with the ambient atmosphere or fluid by way of an opening 22a, the latter being arranged to be suitably closed by means such as a plug 14p. Alternatively chamber 22 may be maintained at superambient pressure by being filled with fluid under pressure prior to sealing, or may be connected to a second fluid under pressure via the opening 22a. Thus the diaphragm may be utilized to provide indications of either absolute, gage or differential pressure.

The pressure-sensitive sensor or diaphragm 18d is connected to motion-amplifying means whereby the extremely small displacements or travels of the moving portion of the diaphragm may be transformed into a practical extent of movement of the moving component of a potentiometer, it being evident that movement or travel of the wiper or contact of a potentiometer through a maximum distance of the order of but a few thousandths of an inch would not provide satisfactory resolution and potential variation. To keep masses of components low and resonant frequencies high and over-all dimensions at a minimum, amplification is effected in a manner and by means whereby friction effects in joints (joint friction) and backlash error are entirely absent or negligible and hysteresis is similarly of extremely low order. Those novel and very desirable results are secured by effecting the amplification of the diaphragm travel in two stages, whereby deflections of elastically deformed members are kept at very low levels, and by means involving a minimum of lost motion.

To effect the amplification of the sensor travel to a usable or practical swing of a movable potentiometer component (the wiper or contact, for example), the diaphragm is connected by a first connector or transmitter device 24 to a first level device 26, which in the preferred form is cantilever-supported and which in turn is connected by a second connector or transmitter device 28 to a second lever device 30 which directly supports a movable component of the potentiometer. First lever device 26 is firmly secured by suitable means, such as by screws 32, 32a to a base 34 that includes a depending annular skirt 34s that is in turn firmly fixed to housing 10, preferably by interengaging complementary screw thread means and tack-welding at the upper periphery of member 16 as indicated at 16w in FIGURE 2. As will be evident, the base 34 is turned down tightly against rim 18r of the diaphragm means, and then secured against accidental removal by means such as pins or the tack-welding.

Transmitter device 24 may be formed as an integral part of the diaphragm means, but preferably and as shown in FIGURE 2, is a rod-like member brazed in a complementary socket formed in an upstanding axial boss provided on the diaphragm 18d to provide an equivalent integral structure. The lever device 26 is made of strong resilient material, and is provided with what is in effect an integral frictionless flexural pivot in the form of a flexure zone or frictionless hinge 26f by locally reducing the cross section as indicated in FIGURE 2. The transmitter 24 is similarly of strong resilient material and is provided with a frictionless pivot zone adjacent is upper end by means of an annular groove which effects a local reduction of the cross section of the transmitter at 24f immediately adjacent its juncture with lever device 26. The lever device 26 is provided with a bore into which the upper end portion of the transmitter extends with adequate clearance for proper flexure; and also a smaller bore coaxial with the first bare and into which an upper end portion of the transmitter of reduced diameter tightly fits as indicated. The juncture of the transmitter 24 and lever device 26 is secured against loss motion or backlash by fusion-uniting the two as by brazing or welding the two together at the periphery of the upper protruding end of the transmitter, at a point indicated at 26j to provide an integral structure thereat. It is evident that with the connections thus far described, the very small travels or movements of the diaphragm 18d are transmitted faithfully by the transmitter 24 to lever device 26, the flexible of flexural pivot portion of the transmitter per the lever device about flexure zone 26f and the travel being amplified by the lever device to produce at the free end 26e thereof a travel several times that of the transmitter. For example, a full-range travel of the transmitter 24 of 0.003 inch produces an angular deflection of lever 26 of approximately ±2° about zone 26f and an end movement of about .027 inch. Hence, since the angular travel of the lever is very small, the motion of the free end of the lever is substantially linear and the stresses created in the flexure zones of the transmitter and the lever device are of satisfactorily low order and hysteresis effects are substantially negligible.

The maximum range of movement of the free end of lever 26 is insufficient for satisfactory direct operation of a potentiometer wiper or contact and yet restrict the masses, moments, and dimensions to those permitted by the practical attainment of the objects of the invention; and accordingly the travel or movement of the free end 26e of lever device 26 is subjected to further frictionless amplification without joint loss or backlash. To the latter end, the second transmitter device 28, preferably and as depicted in the form of a rod of stiff resilient material, is fusion-united to the free end of lever device 26 to provide an integral connection thereat and the movement or travel of end 26e is thereby transferred to the driven end of the second lever device 30, as indicated. Since the movement of the free end of lever 26 is along an arcuate path centered within flexure zone 26f, allowance is made for slight flexing along the path of movement of transmitter 28. To that end there is provided in the preferred structure illustrated, a flexure zone F (FIGURE 2), that is provided by appropriate reduction of the cross section of the structure at a point defined by the intersection of the axis of transmitter 28 and an axis through the centers of flexure zone 26f and the flexure zone 24f at the upper end of transmitter 24, which axes are indicated by dot-dash lines.

Continuing with reference to FIGURE 2 and with supplementary reference to FIGURES 3, 4 and 5, the upper lever device 30 is supported for rocking motion around an axis defined by a commercial crossed leaf-spring flexural pivot 36 of the type marketed by Utica Division of the Bendix Corporation, Utica, New York, and advertised in a publication No. OOU-6-613A of that manufacturer. One outboard cylindrical portion of the flexural pivot 36 is fitted with a snug fit in a complementary transverse bore 30b formed in the lever device, and tack-welded at one edge to secure the two components together. The other cylindrical end portions of the flexural pivot 36 are firmly clamped (with optional welding) to respective ones of pedestals 34 and 34p' upstanding from base 34, by clamping means including a block 34b and screw 34q. In each instance the pedestal is formed with a saddle and the block with a downwardly facing concavity which together are suitably complementary to and dimensioned so that the respective end of the flexural pivot device is firmly embraced and held fixed. Thus the upper lever device is mounted for limited substantially frictionless rocking movements about the noted axis.

The upper end of upper transmitter device 28 is formed as a head or enlargement that is fusion-united with the cylindrical outer surface of one end portion (FIGURES 2, 5 and 6) of a second crossed leaf-spring flexural pivot device 40, the other cylindrical end portion of which device 40 is firmly mounted in a second transverse bore 30c formed in lever device 30 and is tack-welded to the lever to avoid displacement. The noted fusion-union of transmitter device 28 to the pivot device 40 may be by welding as is evident to those skilled in the precision transducer art. As is now evident, the very small travels of diaphragm 18d are transmitted and translated to lever device 30 with amplification by lever device 26, the procedure involving no backlash and being substantially without friction since in essence the plural-lever and transmitter means are all effectively formed into a substantially integral structure comprising the septum or diaphragm. Further, due to the very small degree or extent of flexing of the several flexure zones or pivots, hysteresis is substantially insignificant. In an exemplary transducer with diaphragm of dimensions and full travel of .003 inch as previously noted, effective lever-arm lengths of 0.045" and 0.360" at lever device 26, effective lever-arm lengths of 0.150 and 0.6" at lever device 30, and a potentiometer wiper sweep of 0.10", the full-range angular motions of lever devices 26 and 30 are approximately 4° and 11°, respectively, giving a theoretical motion multiplication ratio of 36 to 1, the angular motions being in both cases one-half in each direction from a midrange position. Thus it is evident that movements or travels are such as to allow use of very rigid but small and light components, and yet utilize the very small travel of the diaphragm through first and second stages of motion amplification to operate a potentiometer with excellent resistance variation and resolution.

Lever device 30 includes at the distant free end thereof a potentiometer contact support 30s (FIGURE 2) of insulative material. The support 30s may be secured to the end of the metallic lever member by suitable means such as by fusion or an adhesive. The support has attached thereto, as by ceramic fusion or by adhesive, a very light-weight but strong and rigid potentiometer contact device 42. The contact device is formed of very fine bare conductive wire bent to form an elongate closed loop or "bead" 42b (FIGURE 3) supported by upper and lower divergent reaches or struts integral with the loop and welded together at the twisted juncture and which divergent reaches extend from respective transverse end portions such as 42t (FIGURE 3) that extend across support 30s (preferably in grooves as indicated in FIGURE 2) and which are secured thereat to the support as by adhesive or by fusion. The loop or "bead" 42b is arranged to serve as a low-friction contact and to brush along the contact zone or region of a potentiometer resistance element 44 which in the illustrated potentiometer is a coil of closely spaced turns of resistance wire 44w wound on an insulative mandrel 44m. The mandrel 44m is affixed in adjusted position onto a bracket 46 (FIGURE 3) that is in turn adjustably mounted on an upright pedestal 34k formed as a part of base 34. Adhesive attachment of the mandrel 44m to bracket 46 has been found to be satisfactory; and attachment of bracket 46 to pedestal 34k is preferably by bolt means as indicated in FIGURE 3.

Electrical connections to the contact 42 and to the ends of resistance element 44w are made by respective insulated wires 42t and 44t (FIGURE 2) which are welded to contact 42 and resistance wire 44w, respectively, and extend to respective sealed lead-through terminals such as T and T' that are provided in cap 12. The insulated wires are preferably secured against undesired displacement by being adhesively affixed to structure such as lever device 30 and housing 10 insofar as is practicable, in a fashion known in the art.

Figure 1:
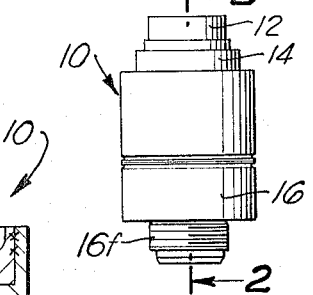
FIGURE 1 is a view in elevation of the preferred exemplary transducer according to the invention, but not necessarily to scale in all parts.

The preceding detailed description has been directed to a specific arrangement of components of the character described. In some instances other arrangements and combinations of flexural pivots are useful and valuable. For example, in some instances it is preferred to form the two lever devices and the two transmitter devices as an integral structure milled from a single piece of metal, as indicated somewhat diagrammatically in FIGURE 7 wherein the components are numbered and formed as shown, the integrated components providing flexure zones such as are shown at G and H and employing fixedly supported cylindrical cross leaf-spring flexural pivot devices of the previously noted type at pivot zones M and N. Also, in other instances the positive and frictionless amplification of the movement of the diaphragm without backlash is effected by using commercial cylindrical cross leaf-spring flexural pivot devices extensively, as indicated in FIGURE 9, wherein lever and transmitter devices positioned similarly to those depicted in FIGURE 2 are numbered similarly but with a prefix numeral 2 (as for example, transmitter 224). In the modified arrangement indicated in FIGURE 9, the upper lever device is in the form of a lever of the third class rather than a lever of the first class as in the principal embodiment depicted in FIGURE 1; however the principles are broadly or essentially the same. In FIGURE 9, five crossed leaf-spring flexural pivot devices of the previously noted type are employed as components of the lever devices to provide zones of flexure, the pivot devices being indicated diagrammatically. The transmitters 224 and 228 are of characteristics made evident in the drawings, transmitter 224 being similar to transmitter 28 of FIGURE 2.

An additional modified form of integrated lever and transmitter structure is diagrammatically illustrated in FIGURE 8, wherein equivalent components are numbered as in FIGURE 2 but with the numeral 3 added as prefix. In FIGURE 8, component 328 is a transmitter in the form of a stiff resilient thin ribbon-like strut; but in other respects the structure is or may be like that illustrated in FIGURE 7.

In those instances where it is desirable, one or the other or both of the lever devices may be arranged for very accurate counterbalancing, in a manner and by means illustrated in FIGURE 7. Therein a bore 130b, preferably tapped, is provided in the main lever member, and the required mass of slug 130w is deposited in the bore. The slug may be deposited, or otherwise disposed, in the bore, as will be evident to those skilled in the art. Other means of effecting proper balancing and properly correcting adverse tendency to oscillation of either lever device may be employed, such as removing mass from a lever member as indicated at 30' on lever device 30 in FIGURE 2.

It will be evident to those skilled in the art that the principal source of friction in the disclosed transducer is the wiper contact brushing on the resistance element, since the several flexural pivots or zones are substantially frictionless. The friction effect created by the contact brushing on the resistance element is unavoidable in a potentiometer; however, by means of the particular configuration of wiper contact means used, the friction force is made to be extremely small without danger of the loop or bead 42b breaking contact with the element while under vibration. The specific contact configuration is within the subject matter of a prior patent application, Serial No. 349,786 filed February 18, 1964, to which application reference may be made for further specific details if necessary and the disclosure of which application is incorporated herein by reference. The friction effect or force is, of course, effectively amplified by the dual motion-amplifying means including the lever devices such as 26 and 30; however the friction force is so small that the maximum forces required to be translated by the connector or transmitters such as 24 and 28 to overcome the friction are at most of the order of a very few grams. Thus it is seen that the transducer as arranged has no joint friction whatever and is capable of great accuracy over a very wide range of pressures including very high pressures, despite being of very small dimensions. For example, in the presently manufactured transducer incorporating the principles of the invention and of the general configuration illustrated in FIGURES 1 and 2, the body diameter is 1.0 in., the length excluding the electrical and fluid connection portions is 1.0 in., a typical pressure range is 0–1000 p.s.i., the accuracy is within ±1.0% under the adverse environmental conditions including vibration of 35 G intensity and 2000 cycles/sec. Due to the very high natural frequency, necessity for liquid damping media is entirely eliminated, which permits employment of the transducer in cryogenic environments as well as with high ambient temperature, and makes the transducer LOX compatible. The latter is a capability not possessed by any Bourdon tube type transducer.

The preceding description in detail of a preferred physical embodiment of the invention and of various modifications thereof makes it evident that the aforenoted objects have been fully attained. It is evident that in the light of the preceding disclosure variations and changes in the preferred form of structure will occur to those skilled in the art, and accordingly it is desired that the scope of the invention be not restricted to specific details of the illustrated transducer but that it be restricted only by the terms of the appended claims.

We claim:
1. A high pressure potentiometric transducer for translating directly into electrical signal form the pressure exhibited by a fluid under high pressure admitted thereto, said transducer comprising:
 first means, including housing and support means and providing a chamber and an opening into the chamber for admission thereinto of fluid under pressure, said first means including a thick elastic diaphragm of high resistance to deformation and of high natural frequency of oscillation said diaphragm forming at least a portion of the interior wall bounding said chamber and having a center portion which travels incident to change of deformation of the diaphragm incident to change of exhibited pressure;
 second means, including potentiometer means having first and second electrical components the first of which is a resistance element and the second of which is a wiper contact, one of said components being supported by said first means and the other of said components being movable;
 third means, including first integral lever means comprising a first lever device comprising a rigid portion connected to said first means for support thereby and comprising first substantially frictionless flexible means forming part of said lever device and permitting limited movement of a movable portion of the lever device about a zone of flexure and said third means including first transmitter means integrally interconnecting said diaphragm and said first lever device for lossless transmission of motion of said center portion of said diaphragm to said first lever device to move the said portion thereof incident to change of deformation of the diaphragm;
 and fourth means, including second lever means comprising a second lever device comprising an intermediate portion pivotally affixed to said first means for support thereby and comprising a substantially frictionless flexible means permitting limited movement of a movable portion of the said second lever device about a pivot zone, said fourth means integrally comprising a second transmitter means interconnecting said first lever device and said second lever device for movement of the movable portion of said second lever device incident to movement of the movable portion of the first lever device, and the movable portion of said second lever device carrying said other of said electrical components to move the latter to cause relative movement between said components to vary said potentiometer means incident to movement of the movable portion of said second lever device,
 said first and second lever means and said transmitter means being effective to provide substantially frictionless compound amplification of the travel of said center portion of said diaphragm incident to change of pressure in said chamber,
 said transducer having characteristics such that the natural frequencies of movable parts of said transducer are very high and are such that said transducer may in the complete absence of liquid damping means for said movable parts furnish highly accurate pressure-representing signals of high pressures in environments including environments of intense high-frequency vibration and environments of very low ambient temperature.

2. A potentiometric pressure transducer adapted for use to translate changes of pressure in a fluid under high pressure into equivalent changes of electric resistance while in cryogenic environments, said transducer comprising:
 first means, including housing means and support means in said housing means, said first means providing a chamber and a port communicating with the chamber for admission thereinto of fluid under presure;
 second means, including a strong resilient pressure-sensitive diaphragm characterized by a high natural frequency of vibration and having a generally circular face forming a portion of the interior wall of said chamber and having a middle portion movable to travel incident to distortion of the diaphragm in response to change in the pressure exhibited by fluid admitted to said chamber;
 third means, including terminal means comprising a plurality of terminals and including a potentiometer having an elongate resistance element affixed to said first means and having an end connected to one of said terminals and having a wiper contact means having a contact arranged for brushing contact along the resistance element and connected to a second of said terminals, for varying the resistance exhibited between said terminals in response to movement thereof; and
 fourth means, including integrally-connected compound-lever motion-amplifying means anchored to said first means and connecting said middle portion of said diaphragm and said wiper contact means and effective without friction or lost-motion to translate with first and second stages of motion amplification the travel of said middle portion of said diaphragm to said wiper contact, said compound-lever motion-amplifying means comprising a first motion-amplifying lever device integrally connected to said diaphragm and a second motion-amplifying lever device integrally connected to said first lever device and to said wiper contact, said lever devices comprising frictionless flexural pivot means permitting rocking movements of lever arm portions of those devices and said connections being provided by resilient transmitters comprised in said motion-amplifying means and integrally connecting said diaphragm to said wiper contact means to provide for amplified translation of travel of said middle portion of said diaphragm to said wiper contact means without backlash, said transducer being of very small maximum dimension transverse to the direction of deflection of said diaphragm and such dimension being of the order of less than one and one-half times the diameter of the diaphragm, and said transducer having characteristics such that the natural frequencies of movable parts thereof are very high and are such that said transducer may in the complete absence of liquid damping means for said movable parts furnish highly-accurate signals representative of high pressures in environments including intense high-frequency vibration and extremely low ambient temperature.

3. A dry high-pressure potentiometric transducer for accurate translation of changes of pressure in a fluid under high pressure admitted to said transducer while the transducer is subjected to extremely severe vibration in the range from 0 to 2000 cycles per second with accelerations in the range from 0 G to 35 G, said transducer means comprising:

a small extremely strong resilient diaphragm having a portion subject to travel of the order of a very few thousandths of an inch incident to deformation of the diaphragm incident to change from 0 p.s.i. to 1000 p.s.i. in the pressure exhibited by the fluid admitted thereto;

means including housing means, providing for housing and supporting said diaphragm and for admitting the fluid under pressure to said diaphragm;

a potentiometer including a resistance element and a wiper with a contact; and integral means including compound lever means and interconnecting strut means integral with said diaphragm, characterized by extremely low friction and hysteresis effects, said integral means being interposed between and interconnecting said diaphragm and said wiper for operating the latter through a range of motion of the order of more than 25 times greater than the corresponding range of motion of the center of said diaphragm incident to deformation of the diaphragm, whereby said transducer may successfully be operated in cryogenic and high temperature environments.

References Cited by the Examiner
UNITED STATES PATENTS

| | | | |
|---|---|---|---|
| 3,032,732 | 5/1962 | Zuehlke et al. | 73—398 X |
| 3,161,061 | 12/1964 | Ames. | |
| 3,173,120 | 3/1965 | Marks et al. | 338—36 |
| 3,182,495 | 5/1965 | Johnson. | |

RICARD M. WOOD, *Primary Examiner.*

W. D. BROOKS, *Assistant Examiner.*

UNITED STATES PATENT OFFICE
CERTIFICATE OF CORRECTION

Patent No. 3,289,136　　　　　　　　　　　　November 29, 1966

Eugene A. Marks et al.

It is hereby certified that error appears in the above numbered patent requiring correction and that the said Letters Patent should read as corrected below.

Column 2, line 58, for "principle" read -- principal --; column 4, line 19, for "is" read -- its --; line 26, for "bare" read -- bore --; lines 35 and 36, for "faith-faithfully" read -- faithfully --; lines 37 and 38, for "flexible of flexural pivot portion of the transmitter per- the lever device about flexure zone 26f and the travel being amplified" read -- flexible or flexural pivot portion of the transmitter permitting the slight angular motion of the lever portion of the lever device about flexure zone 26f and the travel --; column 6, lines 34 and 38, for "cross", each occurrence, read -- crossed --.

Signed and sealed this 19th day of September 1967.

(SEAL)
Attest:

ERNEST W. SWIDER　　　　　　　　　　　　EDWARD J. BRENNER
Attesting Officer　　　　　　　　　　　Commissioner of Patents